(12) United States Patent
Song et al.

(10) Patent No.: US 12,291,155 B2
(45) Date of Patent: May 6, 2025

(54) ECU AND TARGET PATH DETERMINATION METHOD THEREBY

(71) Applicant: Samsung Electronics Co., Ltd., Suwon-si (KR)

(72) Inventors: Minwoo Song, Suwon-si (KR); Chulmin Lee, Suwon-si (KR); Jaeseung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 18/174,210

(22) Filed: Feb. 24, 2023

(65) Prior Publication Data

US 2023/0219513 A1 Jul. 13, 2023

Related U.S. Application Data

(63) Continuation of application No. PCT/KR2021/011620, filed on Aug. 30, 2021.

(30) Foreign Application Priority Data

Sep. 1, 2020 (KR) ........................ 10-2020-0111282

(51) Int. Cl.
*B60R 16/023* (2006.01)
*B60W 50/04* (2006.01)

(52) U.S. Cl.
CPC ....... *B60R 16/0232* (2013.01); *B60W 50/045* (2013.01)

(58) Field of Classification Search
CPC ... B60R 16/0232; B60R 16/023; B60R 16/03; B60W 50/045; B60W 50/0098;
(Continued)

(56) References Cited

U.S. PATENT DOCUMENTS 6,553,297 B2 4/2003 Tashiro et al.
7,007,128 B2 2/2006 Arimilli et al.
(Continued)

FOREIGN PATENT DOCUMENTS

JP 2004-136816 A 5/2004
JP 3912218 B2 5/2007
(Continued)

OTHER PUBLICATIONS

International Search Report dated Nov. 8, 2021, issued in International Patent Application No. PCT/KR2021/011620.

*Primary Examiner* — Richard M Camby
(74) *Attorney, Agent, or Firm* — Jefferson IP Law, LLP

(57) ABSTRACT

A method of determining a target path according to a source electronic control unit (ECU) mounted on a vehicle is provided. The method includes obtaining state information of a plurality of paths connecting the source ECU with a destination ECU, selecting the target path for target data from among the plurality of paths based on the state information, and transmitting the target data to the destination ECU through an ECU located on the selected target path, the state information including information about at least one of power consumption of an ECU located on the paths, a temperature of the ECU located on the paths, a latency of the paths, and a transmission success rate of the paths.

13 Claims, 17 Drawing Sheets

(58) Field of Classification Search
CPC ..... B60W 2050/0005; B60W 2556/45; B60W 2756/00; H04L 45/127; H04L 45/66; H04L 45/70; H04L 45/124; H04L 67/12; G06N 3/044; G06N 3/0464; G06N 3/084; G06N 3/088
See application file for complete search history.

(56) References Cited

U.S. PATENT DOCUMENTS

| | | |
|---|---|---|
| 7,047,117 B2 | 5/2006 | Akiyama et al. |
| 8,863,256 B1 * | 10/2014 | Addepalli ............. H04W 12/03 |
| | | 713/168 |
| 9,838,300 B2 | 12/2017 | Reese et al. |
| 12,047,418 B2 * | 7/2024 | Cam-Winget ...... H04L 41/0894 |
| 2010/0220653 A1 | 9/2010 | Hwang et al. |
| 2013/0218371 A1 | 8/2013 | Simard et al. |
| 2016/0016523 A1 * | 1/2016 | Yousefi ................ H04W 72/56 |
| | | 370/401 |
| 2016/0255575 A1 * | 9/2016 | Ricci .................... G06F 3/0488 |
| | | 370/329 |
| 2018/0246713 A1 * | 8/2018 | Elizalde .................... G06F 8/30 |
| 2018/0319235 A1 | 11/2018 | Wittenschlaeger |
| 2020/0210167 A1 | 7/2020 | Ogawa et al. |
| 2020/0382444 A1 * | 12/2020 | Yousefi .................. B60L 50/00 |

FOREIGN PATENT DOCUMENTS

| | | |
|---|---|---|
| JP | 5753824 B2 | 7/2015 |
| JP | 2019-036855 A | 3/2019 |
| JP | 2019-131140 A | 8/2019 |
| KR | 10-1647139 B1 | 8/2016 |

* cited by examiner

FIG. 6

| PATHS | LATENCY | TRANSMISSION SUCCESS RATE | ECU IDENTIFICATION INFORMATION | TEMPERATURE | AMOUNT OF DATA | POWER CONSUMPTION | USE RATE |
|---|---|---|---|---|---|---|---|
| FIRST PATH | 10ms | 96% | B | 50 DEGREES | 200MB | 10W | 70% |
| | | | C | 60 DEGREES | 300MB | 12W | 80% |
| SECOND PATH | 6ms | 98% | D | 40 DEGREES | 150MB | 8W | 65% |
| | | | E | 45 DEGREES | 250MB | 10W | 70% |
| THIRD PATH | 5ms | 100% | D | 40 DEGREES | 150MB | 8W | 65% |
| | | | F | 70 DEGREES | 350MB | 18W | 85% |
| FOURTH PATH | 4ms | 99% | F | 70 DEGREES | 350MB | 18W | 85% |

FIG. 7

| ECU IDENTIFICATION INFORMATION | LIMIT TEMPERATURE | LIMIT POWER CONSUMPTION |
|---|---|---|
| A | 70 DEGREES | 20W |
| B | 60 DEGREES | 18W |
| C | 65 DEGREES | 18W |
| D | 60 DEGREES | 20W |
| E | 70 DEGREES | 15W |
| F | 75 DEGREES | 20W |

FIG. 8

| TYPE OF TARGET DATA | DEGREE OF IMPORTANCE | REFERENCE LATENCY |
|---|---|---|
| FRONT OBSTACLE DATA | 3 | 5ms |
| DRIVER'S DATA | 2 | 8ms |
| INDOOR DATA | 1 | 10ms |

ECU AND TARGET PATH DETERMINATION METHOD THEREBY

CROSS-REFERENCE TO RELATED APPLICATION(S)

This application is a continuation application, claiming priority under § 365(c), of an International Application No. PCT/KR2021/011620, filed on Aug. 30, 2021, which is based on and claims the benefit of a Korean patent application number 10-2020-0111282, filed on Sep. 1, 2020, in the Korean Intellectual Property Office, the disclosure of which is incorporated by reference herein in its entirety.

BACKGROUND

1. Field

The disclosure relates to the field of automotive electrical and electronic systems. More particularly, the disclosure relates to a method of determining a path for transmitting and receiving data between electronic control units (ECUs) mounted on a vehicle.

2. Description of Related Art

According to an architecture flow for describing the development of automotive technology, it is expected that vehicles will be developed from having a current distributed structure of functions to an integrated structure of functions, and the integrated domains will be controlled by a central controller. That is, according to the technical development, data may be centrally processed, and cloud connection is also predicted to be possible in the future.

In order to achieve autonomous vehicles which are currently receiving focused attention, data obtained from a plurality of sensors has to be processed. In accordance with the description above, to centrally process many pieces of sensing data, data transmission and reception between electronic control units (ECUs) mounted on a vehicle is important. The data transmission and reception have to be performed by physical hardware. Thus, performance degradation, a temperature rise, an increased latency, etc. of the hardware may be caused, which may become an obstacle for the development of autonomous driving technology. Therefore, for the central processing of data, a method of seamlessly transmitting and receiving data between the ECUs is required.

An artificial intelligence (AI) system is a computer system, and unlike a previous rule-based smart system, the AI system is a system that trains itself, decides, and becomes smarter. The more the AI system is used, the higher the recognition rate of the AI system and the AI system may more accurately understand the user's taste. Thus, the previous rule-based system has been gradually replaced by a deep learning-based AI system.

AI technologies are composed of machine learning (deep learning) and element technologies using the machine learning.

Machine learning is an algorithm technology that classifies/learns characteristics of input data on its own. The element technology is a technology that uses machine learning algorithms, such as deep learning, etc., and includes technical fields of linguistic understanding, visual comprehension, inference/prediction, knowledge representation, operation control, etc.

The linguistic understanding is a technology to recognize and apply/process human language/characters and includes processing of natural language, machine translation, a conversation system, query response, speech recognition/synthesis, etc. The visual comprehension is a technology to recognize and process objects as in human vision and includes object recognition, object detection, image search, human recognition, scene understanding, spatial understanding, image enhancement, etc. The inference prediction is a technology to examine and logically infer and predict information and includes inference based on knowledge/probabilities, optimization prediction, preference-based planning, recommendation, etc. The knowledge representation is a technology to automatically process human experience data into knowledge data and includes knowledge establishment (data generation/classification), knowledge management (data usage), etc. The operation control is a technology to control autonomous driving of a vehicle and motions of a robot and includes motion control (navigation, collision avoidance, driving), manipulation control (behavior control), etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic control unit (ECU) and a method of determining a target path according to the ECU, according to an embodiment, to select an optimum target path from among paths between a source ECU and a destination ECU.

Another aspect of the disclosure is to provide an ECU and a method of determining the target path according to the ECU, according to an embodiment, to minimize heating, power consumption, and performance degradation of hardware used for data transmission and reception.

Another aspect of the disclosure is to provide an ECU and a method of determining the target path according to the ECU, according to an embodiment, to transmit important data to a destination ECU with a decreased latency.

Additional aspects will be set forth in part in the description which follows and, in part, will be apparent from the description, or may be learned by practice of the presented embodiments.

In accordance with an aspect of the disclosure, a method of determining a target path provided. The method includes obtaining state information of a plurality of paths connecting the source ECU with a destination ECU, selecting the target path for target data from among the plurality of paths based on the state information, and transmitting the target data to the destination ECU through an ECU located on the selected target path, wherein the state information includes information about at least one of power consumption of an ECU located on the paths, a temperature of the ECU located on the paths, a latency of the paths, and a transmission success rate of the paths.

The selecting of the target path includes identifying a reference latency corresponding to a degree of importance of the target data, and selecting the target path having a latency less than or equal to the reference latency from among the plurality of paths.

The selecting of the target path includes selecting the target path including an ECU, a predicted temperature of which is less than a limit temperature, from among the plurality of paths.

The selecting of the target path includes selecting the target path including an ECU, predicted power consumption of which is less than limit power consumption, from among the plurality of paths.

The selecting of the target path includes selecting a plurality of target paths for the target data from among the plurality of paths, and the transmitting of the target data includes splitting the target data into a plurality of target data parts, and transmitting the plurality of target data parts to the destination ECU through ECUs located on the selected plurality of target paths.

The method further includes splitting row data into a first row data part and a second row data part, generating a first target data part by processing the first row data part, and transmitting the second row data part to another ECU, wherein the transmitting of the target data includes transmitting the first target data part to the destination ECU through the ECU located on the selected target path, wherein the second row data part may be processed by the other ECU, and a second target data part generated as a result of the processing of the second row data part may be transmitted from the other ECU to the destination ECU.

The state information may be obtained for each predetermined cycle, and the target path to be used for a current cycle may be selected based on the state information of a previous cycle.

The obtaining of the state information includes obtaining, from a plurality of ECUs mounted on the vehicle, identification information of an ECU through which data is to be transmitted in the current cycle, and the selecting of the target path may include selecting the target path by taking into account an amount of data to be transmitted to each of the ECUs in the current cycle.

The method further includes receiving information indicating the target path and the target data from another ECU connected to the source ECU, wherein the target path selected from among the plurality of paths may be different from the target path indicated by the information received from the other ECU.

The selecting of the target path includes inputting the state information to a deep neural network (DNN) trained based on training information, and selecting the target path based on an output result of the DNN.

In accordance with another aspect of the disclosure, a source electronic control unit (ECU) is provided. The source electronic control unit includes a memory configured to obtain state information of a plurality of paths connecting the source ECU with a destination ECU, a processor configured to select a target path for target data from among the plurality of paths based on the state information, and an output port configured to transmit the target data to the destination ECU through an ECU located on the selected target path, wherein the state information includes information about at least one of power consumption of an ECU located on the paths, a temperature of the ECU located on the paths, a latency of the paths, and a transmission success rate of the paths.

The processor may further be configured to identify a reference latency corresponding to a degree of importance of the target data and select the target path having a latency less than or equal to the reference latency from among the plurality of paths.

The processor may further be configured to select the target path including an ECU, a predicted temperature of which is less than a limit temperature, from among the plurality of paths.

The processor may further be configured to select a plurality of target paths for the target data from among the plurality of paths and split the target data into a plurality of target data parts, and the output port may further be configured to transmit the plurality of target data parts to the destination ECU through ECUs located on the selected plurality of target paths.

The processor may further be configured to split row data into a first row data part and a second row data part and generate a first target data part by processing the first row data part, and the output port may further be configured to transmit the second row data part to another ECU and transmit the first target data part to the destination ECU through the ECU located on the selected target path, wherein the second row data part may be processed by the other ECU, and a second target data part generated as a result of the processing of the second row data part may be transmitted from the other ECU to the destination ECU.

The processor may further be configured to split row data into a first row data part and a second row data part and generate a first target data part by processing the first row data part, and the output port may further be configured to transmit the second row data part to another ECU and transmit the first target data part to the destination ECU through the ECU located on the selected target path, wherein the second row data part may be processed by the other ECU, and a second target data part generated as a result of the processing of the second row data part may be transmitted from the other ECU to the destination ECU.

The state information may be obtained for each predetermined cycle, and the target path to be used for a current cycle may be selected based on the state information of a previous cycle.

The state information further includes identification information of an ECU through which data is to be transmitted in the current cycle, and the processor may further be configured to select the target path by taking into account an amount of data to be transmitted to each of the ECUs in the current cycle.

The source ECU further includes an input port configured to receive information indicating the target path and the target data from another ECU connected to the source ECU, wherein the target path selected from among the plurality of paths may be different from the target path indicated by the information received from the other ECU.

According to an electronic control unit (ECU) and a method of determining a target path according to the ECU, according to an embodiment, an optimum target path from among paths between a source ECU and a destination ECU may be selected.

Also, according to the ECU and the method of determining the target path according to the ECU, according to an embodiment, it may be possible to minimize heating, power consumption, and performance degradation of hardware used for data transmission and reception.

Also, according to the ECU and the method of determining the target path according to the ECU, according to an embodiment, important data may be transmitted to a destination ECU with a decreased latency.

However, the effects of the ECU and the method of determining the target path according to the ECU, according to an embodiment, are not limited to those described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is an example table showing state information of paths according to an embodiment of the disclosure;

FIG. 7 is an example table showing limit temperatures and limit power consumption of ECUs mounted on a vehicle according to an embodiment of the disclosure;

FIG. 8 is an example table showing a degree of importance and a reference latency according to types of data according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the numbers (for example, a first, a second, etc.) used for describing the embodiments are only identifiers for distinguishing elements from other elements.

Also, when it is described in this specification that one element is "connected to" or "in connection with" another element, the element may be directly connected to or in connection with the other element, but it shall be also understood that the element may be connected to or in connection with the other element with yet another element present therebetween, unless particularly otherwise described.

Also, with respect to an element referred to as a "portion (unit)," a "module," etc., two or more elements may be combined into one element, or one element may be divided into two or more elements each having a specified function. Also, each of the elements to be described hereinafter may additionally perform some or all of functions performed by other elements, in addition to a main function of each of the elements, and the other elements may exclusively perform some of the main functions of the respective elements.

Hereinafter, embodiments according to the technical concept of the disclosure will be sequentially described in detail.

Figure 1:
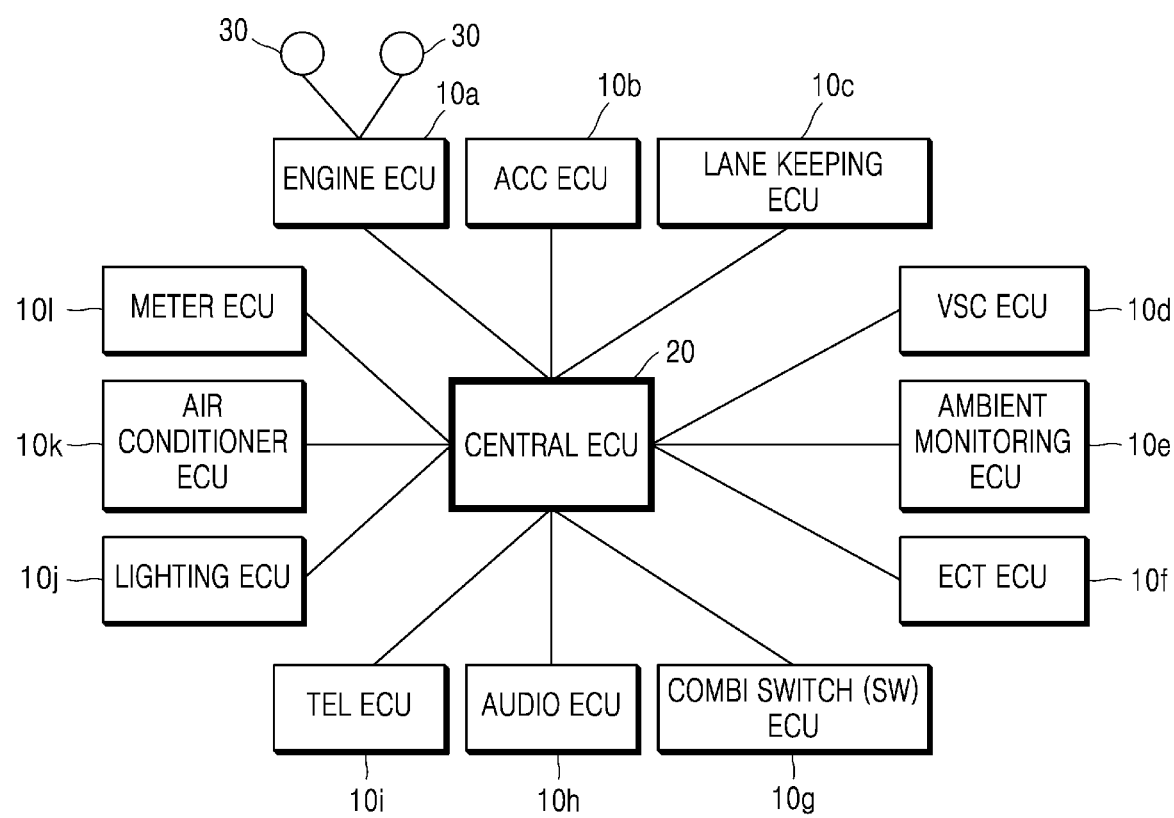
FIG. 1 is a diagram of example electronic control units (ECUs) mounted on a vehicle according to an embodiment of the disclosure.

FIG. 1 is a diagram of example electronic control units (ECUs) mounted on a vehicle according to an embodiment of the disclosure.

As functions of the vehicle have diversified, a plurality of ECUs taking charge of various functions of the vehicle may be mounted on the vehicle. The ECUs may control operations of control target devices (for example, a sensor, an actuator, etc.) of the vehicle.

The ECUs mounted on the vehicle may include an engine ECU 10a, an adaptive cruise control (ACC) ECU 10b, a lane keeping ECU 10c, a vehicle stability control (VSC) ECU 10d, an ambient monitoring ECU 10e, an electronic control transmission (ECT) ECU 10f, a combi switch (SW) ECU 10g, an audio ECU 10h, a telephone (TEL) ECU 10i, a lighting ECU 10j, an air conditioner ECU 10k, a meter ECU 10l, and a central ECU 20.

In detail, the engine ECU 10a is configured to control an engine, which is a power source of the vehicle, and the ACC ECU 10b is configured to adapt the course of the vehicle to follow a preceding vehicle. The lane keeping ECU 10c is configured to control a steering system of the vehicle to have the vehicle autonomously drive along a lane of the road, and the VSC ECU 10d is configured to perform the posture control and the brake control of the vehicle. The ambient monitoring ECU 10e is configured to detect an obstacle existing around the vehicle, through a sensor mounted on the vehicle, and the ECT ECU 10*f* is configured to control a change of speed of an automatic transmission. Also, the combi SW ECU 10*g* is configured to receive an input from a combination switch provided around a driver's seat and transmit various commands of a driver to other ECUs, and the audio ECU 10*h* is configured to control an audio device equipped in the vehicle, according to a command of a passenger, and simultaneously, process a sound signal output from the audio device or a navigation device so as to be output by a speaker. The TEL ECU 10*i* is configured to control a telephone device for a phone call so that the passenger may make a phone call with a device outside of the vehicle, the lighting ECU 10*j* is configured to turn on a sidelight or a headlight or control the brightness of light, according to the ambient brightness, and the air conditioner ECU 10*k* is configured to control a conditioning device equipped in the vehicle. Also, the meter ECU 10*l* is configured to control various states of the vehicle, such as a vehicle speed, engine revolutions per minute (RPM), an opening or closing state of a door, a shift range of the transmission, etc., to be displayed on a front display of the driver's seat.

At least one (for example, the engine ECU 10*a*) of the ECUs mounted on the vehicle may be connected to a control target device 30, such as a sensor, an actuator, etc., and may receive sensing data, etc. from the control target device 30.

As described above, the ECUs may transmit collected data to the central ECU 20, and the central ECU 20 may process/determine the received data and transmit control instructions to the ECUs.

The ECUs illustrated in FIG. 1 are only examples, and according to a vehicle, at least one of the ECUs illustrated in FIG. 1 may not be mounted on the vehicle, or an ECU (for example, a smart key ECU, etc.) not illustrated in FIG. 1 may be mounted on the vehicle.

Figure 2:
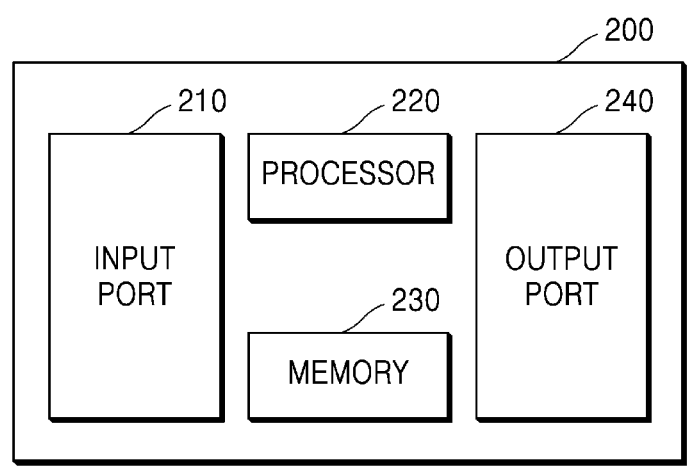
FIG. 2 is a diagram showing components of an ECU according to an embodiment of the disclosure.

FIG. 2 is a diagram showing components of an ECU according to an embodiment of the disclosure. The ECU illustrated in FIG. 2 may correspond to any one of the ECUs illustrated in FIG. 1.

Referring to FIG. 2, an ECU 200 may include an input port 210, a processor 220, a memory 230, and an output port 240.

The input port 210 may receive data transmitted from other ECUs or a control target device (for example, a sensor), and the output port 240 may transmit data to the other ECUs or the control target device (for example, an actuator). For example, the input port 210 may receive sensing data from the sensor, and the output port 240 may transmit a control instruction generated based on the sensing data to the actuator. As another example, the input port 210 may receive data from another ECU, and the output port 240 may transmit the data to yet another ECU. The input port 210 and the output port 240 may be connected to the other ECUs and the control target device through a communication line.

The processor 220 may execute a program stored in the memory 230. For example, the processor 220 may obtain data from the input port 210 or the memory 230 according to a program, may process an arithmetic operation or a logic operation on the data and store a result thereof in the memory 230, or may transmit a control instruction to the control target device through the output port 240. As described below, when there are a plurality of paths for transmitting the data, the processor 220 may select an optimum path from among the plurality of paths.

The memory 230 may store the program for the operation of the processor 220, the data received through the input port 210 and/or the data generated by the processor 220 by processing the data.

The plurality of ECUs mounted on the vehicle may transmit and receive data to and from one another. Here, when there are a plurality of paths available for transmission of data from any one ECU to another ECU, a path to be used for the transmission of data may have to be selected. A method of selecting an optimum path will be described with reference to FIGS. 3 to 10.

Hereinafter, an ECU transmitting data from among the ECUs mounted on the vehicle is referred to as a source ECU, and an ECU corresponding to a final destination of the data is referred to as a destination ECU. The destination ECU may be the central ECU 20, but the destination ECU is not limited thereto. Also, the data to be transmitted by the source ECU is referred to as target data, and a path selected by the source ECU for the transmission of the target data from among the plurality of paths is referred to as a target path.

Figure 3:
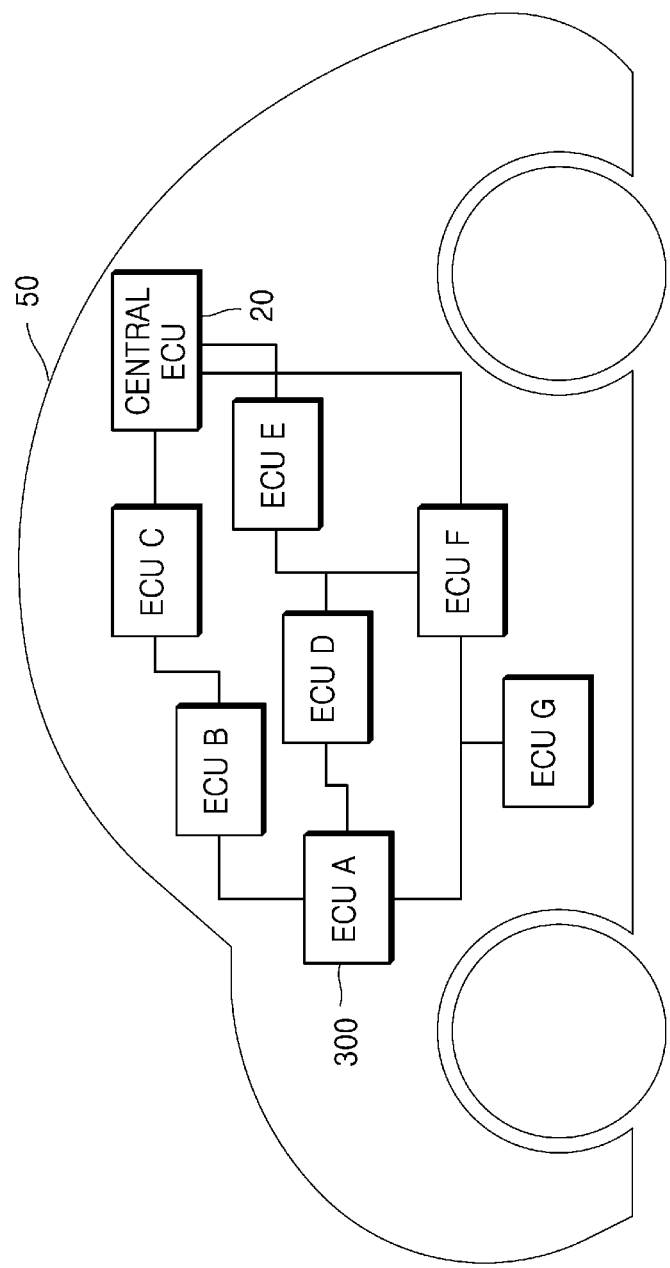
FIG. 3 is a diagram showing ECUs mounted on a vehicle and paths according to an embodiment of the disclosure.

FIG. 3 is a diagram showing ECUs mounted on a vehicle and paths according to an embodiment of the disclosure.

Referring to FIG. 3, it is assumed that ECU A 300 is a source ECU, and the central ECU 20 is a destination ECU. Target data to be transmitted by ECU A 300 to the central ECU 20 may be transmitted through a target path selected from among a plurality of paths.

In detail, as illustrated in FIG. 3, when there are a first path including ECU A 300, ECU B, ECU C, and the central ECU 20, a second path including ECU A 300, ECU D, ECU E, and the central ECU 20, a third path including ECU A 300, ECU D, ECU F, and the central ECU 20, and a fourth path including ECU A 300, ECU F, and the central ECU 20, ECU A 300 may select the target path for the target data from among the first to fourth paths.

When the target path is selected, ECU A 300 may transmit the target data to another ECU located on the target path, and the other ECU may transmit the target data to yet another ECU according to the target path. In detail, when the first path is selected as the target path, ECU A 300 may transmit the target data to ECU B, and ECU B may transmit the target data to ECU C. Also, ECU C may transmit the target data to the central ECU 20, which is the final destination.

The central ECU 20 receiving the target data may generate a control instruction based on a result of analyzing the data and may transmit the control instruction to at least one ECU. In this case, the central ECU 20 may correspond to the source ECU, and the ECU corresponding to the final destination of the control instruction may correspond to the destination ECU.

Figure 4:
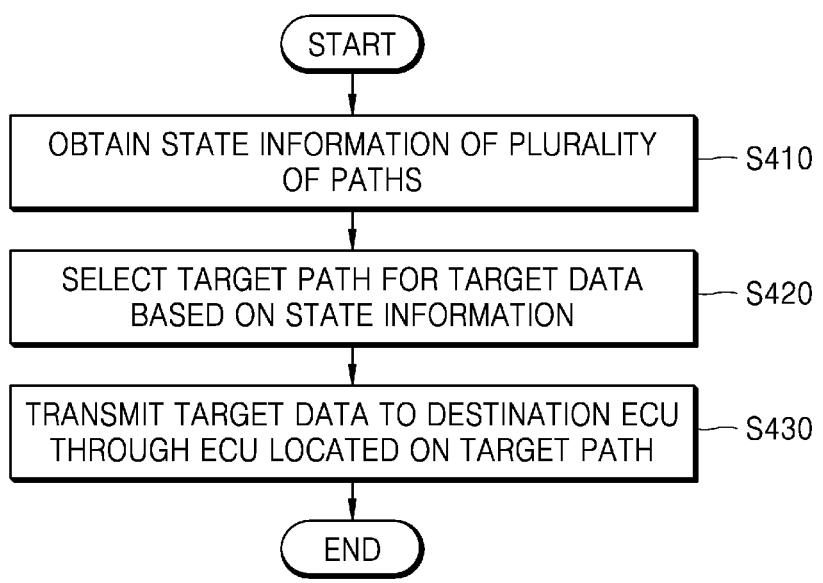
FIG. 4 is a flowchart of a method of determining a target path, according to an embodiment of the disclosure.

FIG. 4 is a flowchart of a method of selecting a target path from among a plurality of available paths according to an embodiment of the disclosure.

Referring to FIG. 4, in operation S410, a source ECU may obtain state information of the plurality of paths. The source ECU may obtain the state information of the plurality of paths based on information received from other ECUs.

Each ECU mounted on a vehicle may transmit information indicating its own state to other ECUs. For example, each ECU may transmit, to the other ECUs, the amount of data transmitted and received, a time of data transmission and reception, information indicating ECUs through which data is received by the ECU, and information indicating a temperature and power consumption, and the ECUs may obtain the state information of the paths based on the information received from the other ECUs.

For example, the ECUs mounted on the vehicle may obtain the state information of the paths available for the ECUs and may select the target path to transmit, to the destination ECU, data received from other ECUs or data collected from a control target device connected to the ECUs.

The state information of the paths may include information about at least one of power consumption of ECUs located on the paths, temperatures of the ECUs located on the paths, latencies of the paths, and transmission success rates of the paths. Here, the latency of the path may indicate a time taken for data to be transmitted from the source ECU to the destination ECU, and the transmission success rate of the path may correspond to a ratio between the amount of data transmitted by the source ECU to an adjacent ECU and the amount of data received by the destination ECU.

In operation S420, based on the state information of the plurality of paths, the source ECU may select the target path for target data from among the paths.

According to an embodiment, the source ECU may identify a reference latency according to a degree of importance of the target data to be transmitted to the destination ECU and may select the target path having a latency less than or equal to the reference latency from among the plurality of paths.

According to another embodiment, the source ECU may select the target path including an ECU, a predicted temperature of which is less than a limit temperature, from among the plurality of paths. Here, the predicted temperature may be calculated according to the amount of target data to be transmitted. For example, when a temperature of the ECU rises by 10 degrees, when the ECU transmits and receives data of 100 MB, the temperature of the ECU may be predicted to rise by 20 degrees, when the ECU transmits and receives target data of 200 MB. A method of calculating the predicted temperature may be pre-stored in the ECUs. The limit temperature of the ECU may be a temperature at which the ECU normally operates and may be predetermined according to the hardware characteristic of the ECU.

According to another embodiment, the source ECU may select the target path including an ECU, predicted power consumption of which is less than limit power consumption, from among the plurality of paths. Here, the predicted power consumption may be calculated according to the amount of target data to be transmitted. For example, when the power consumption of the ECU rises by 3W, when the ECU transmits and receives data of 100 MB, the power consumption of the ECU may be predicted to rise by 6W, when the ECU transmits and receives target data of 200 MB. A method of calculating the predicted power consumption may be pre-stored in the ECUs. The limit power consumption of the ECU may be the amount of power consumed for the ECU to normally operate and may be predetermined according to a hardware characteristic of the ECU.

According to another embodiment, the source ECU may select the target path by taking into account latencies of the paths, power consumption of an ECU located on each path, and/or a temperature of the ECU located on each path. For example, the source ECU may select, as the target path, a path having the least power consumption from among paths including ECUs having a predicted temperature less than a limit temperature, the paths having the latency less than or equal to a reference latency.

In operation S430, the source ECU may transmit the target data to the destination ECU through the ECUs located on the target path. In detail, the source ECU may transmit the target data to an ECU most adjacent to the source ECU on the target path, and the ECU receiving the target data transmits the target data to another ECU according to the target path, so that the target data may arrive at the destination ECU.

According to an embodiment, the ECUs mounted on the vehicle may obtain the state information of the paths for each cycle and may select the target path based on the information obtained for each cycle. This aspect will be described with reference to FIG. 5.

Figure 5:
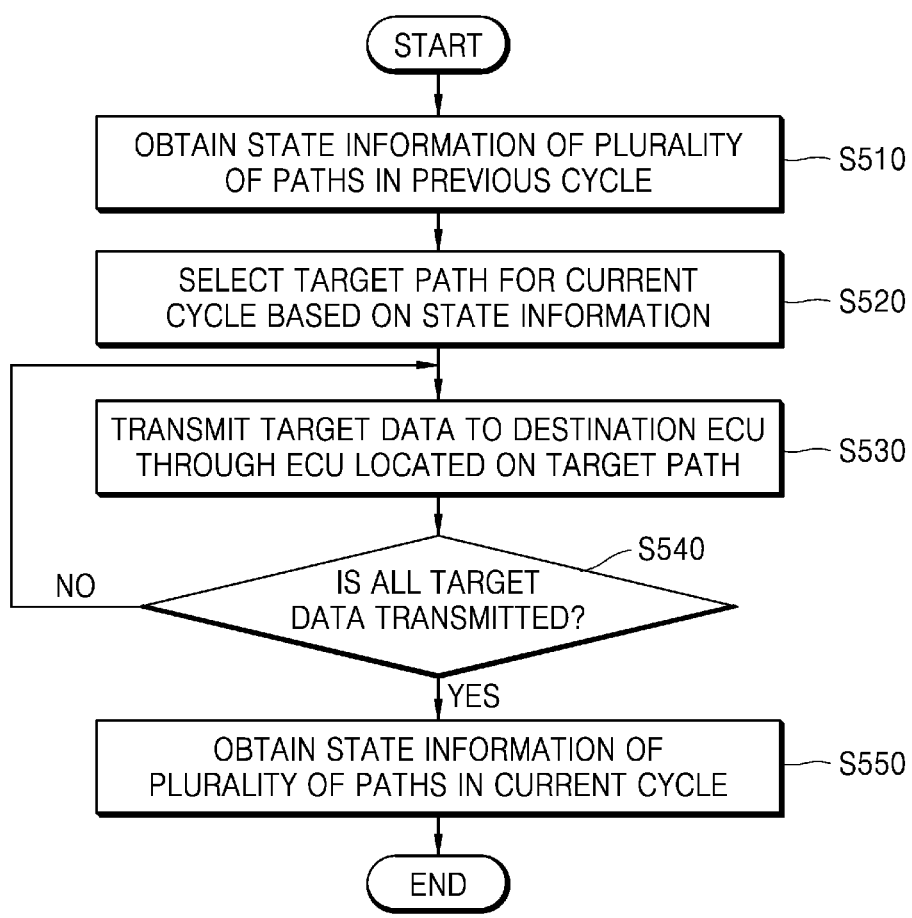
FIG. 5 is a flowchart of a method of determining a target path, according to an embodiment of the disclosure.

FIG. 5 is a flowchart of a method of determining a target path, according to an embodiment of the disclosure.

Referring to FIG. 5, in operation S510, a source ECU may obtain state information of a plurality of paths in a previous cycle.

The source ECU may obtain the state information of the plurality of paths for each cycle, wherein one cycle may correspond to a predetermined time interval. For example, when one cycle is 5 minutes, the source ECU may obtain the state information of the plurality of paths every 5 minutes.

As another example, one cycle may correspond to a predetermined amount of data transmitted and received. For example, when one cycle corresponds to 500 MB, whenever the amount of data transmitted and received between ECUs corresponds to 500 MB, the source ECU may obtain the state information of the paths.

In operation S520, the source ECU may select the target path for a current cycle based on the state information of the plurality of paths.

As described above, the source ECU may select the target path based on the latency of each path, the temperature of the ECUs located on each path, and/or the power consumption of the ECUs located on each path.

In operation S530, the source ECU may transmit target data to a destination ECU through the ECU located on the target path.

In operation S540, the source ECU may determine whether or not all of the target data is transmitted, and when all of the target data is transmitted, the source ECU may obtain the state information of the paths in the current cycle, in operation S550. The source ECU may select the target path to be used in a next cycle, based on the state information of the current cycle.

In other words, according to the disclosure, a target path which may generate the optimum effect from among a plurality of paths may be selected for each cycle, and thus, heating or performance degradation of a particular ECU may be minimized.

Next, a method of selecting a target path from among paths available for ECU A 300 illustrated in FIG. 3 to transmit target data to the central ECU 20, will be described in detail with reference to FIGS. 6 to 8.

FIG. 6 is an example table showing state information of the paths according to an embodiment of the disclosure.

Referring to FIG. 6, the state information may include a latency, a transmission success rate, identification information of an ECU located on the path, a temperature of the ECU, the amount of data transmitted and received by the ECU, power consumption of the ECU, and a use rate of the ECU.

FIG. 6 shows examples of the information which may be included in the state information, and information not illustrated in FIG. 6 may be included in the state information, and some of the information illustrated in FIG. 6 may not be included in the state information.

A source ECU may obtain the state information based on information received from other ECUs. For example, ECU B may transmit, to the source ECU, information about the amount of data received from other ECUs, the amount of data that ECU B transmits to other ECUs, a temperature, power consumption, a use rate, etc. The source ECU may obtain the state information of each available path, based on the information received from other ECUs including ECU B.

Referring to FIG. 6, the amount of data may denote a size of data or a predetermined number of pieces of data.

The temperature may be measured by a thermistor of an ECU, or according to an embodiment, may be indirectly measured from a frequency of an operating clock of the ECU. For example, in a state in which a temperature corresponding to each frequency of the clock of the ECU is predetermined, an actual temperature corresponding to the frequency of the clock may be calculated.

The use rate denotes the amount of data actually processed by the ECU compared to the maximum amount of data which may be processed by the ECU.

The power consumption is the amount of power consumed by the ECU and may be calculated based on the use rate or the operating clock of the ECU. For example, in a state in which power consumption of the ECU corresponding to each use rate of the ECU is predetermined, actual power consumption corresponding to the use rate of the ECU may be calculated. As another example, in a state in which power consumption corresponding to each frequency of the clock of the ECU is predetermined, actual power consumption corresponding to the frequency of the clock may be calculated.

The source ECU may transmit target data to a destination ECU within a desired latency, based on the state information of the paths, and may select a path including ECUs, loads applied to which due to the target data are less than limit loads, as the target path.

To determine whether excessive loads are applied to the ECUs, due to the processing of the target data, the source ECU may store information about the limit loads of the ECUs.

FIG. 7 is an example table indicating limit loads of ECUs mounted on a vehicle according to an embodiment of the disclosure.

Limit temperatures and limit power consumption of ECU A to ECU F illustrated in FIG. 7 may vary according to the hardware characteristics. When a load applied to an arbitrary ECU due to target data is greater than or equal to a limit load of the ECU, a source ECU may not select a path including the ECU as a target path.

For example, it is assumed that the amount of target data is 300 MB, and predicted temperatures of ECU B, ECU C, ECU D, and ECU E due to the target data are respectively calculated to be 58 degrees, 66 degrees, 50 degrees, and 55 degrees. Here, the predicted temperature of ECU B is less than a limit temperature of 60 degrees, but the predicted temperature of ECU C is higher than a limit temperature of 65 degrees, and thus, the source ECU may not select a first path including ECU C as the target path. The predicted temperatures of ECU D and ECU E are both less than limit temperatures, and thus, the source ECU may select a second path as the target path. That is, the source ECU may select a path including an ECU having a load applied thereto due to the target data, the load being less than a limit load, as the target path.

As another example, when there are a plurality of paths including only the ECU having the load applied thereto due to the target data, the load being less than the limit load, the source ECU may select, as the target path, a path including ECUs having the greatest differences between the loads due to the target data and the limit loads, from among the plurality of paths.

As another example, when there are a plurality of paths including only the ECU having the load applied thereto due to the target data, the load being less than the limit load, the source ECU may select, as the target path, a path indicating the lowest power consumption, from among the plurality of paths.

As another example, when there are a plurality of paths including only the ECU having the load applied thereto due to the target data, the load being less than the limit load, the source ECU may select all of the corresponding paths as the target path. Also, the source ECU may split the target data into a plurality of target data parts and may transmit the target data parts through the target data paths, respectively, thereby distributing the loads due to the target data. The number of parts into which the target data is split may be the same as the number of target paths.

As another example, the source ECU may select the target path by taking into account a reference latency corresponding to the degree of importance of the target data and a latency of each path.

FIG. 8 is an example table showing the degree of importance and a reference latency according to a type of target data according to an embodiment of the disclosure.

Referring to FIG. 8, as the degree of importance shows an increased value, it indicates a higher degree of importance. Front obstacle data is directly related to the safety of a vehicle and a passenger, and thus, may have the highest degree of importance, and the reference latency may be the least as 5 milliseconds (ms). Driver's data indicating a state of a driver has a lower degree of importance than the front obstacle data, and the reference latency may be set as 8 ms. Indoor data such as an indoor image has little direct relevance to the safety of the vehicle, and thus, may have the lowest degree of importance, and the reference latency may be set as 10 ms.

A source ECU may identify the reference latency according to the type of target data and may select a path having a latency less than the identified reference latency as a target path for target data. For example, when the target data to be transmitted to a destination ECU is the front obstacle data, a fourth path having a latency less than the reference latency of 5 ms may be selected as the target path for the target data.

As described above, the source ECU may select the target path by taking into account both of the load due to the target data and the reference latency of the target data. When there are a plurality of target paths, the source ECU may split the target data into parts and may transmit the split parts through the plurality of target paths, respectively, to the destination ECU.

Meanwhile, when a plurality of ECUs mounted on a vehicle are to transmit data collected from a sensor, etc. to the destination ECU, all of the plurality of ECUs may select the target path based on the state information of the paths described above, and in this case, a load may be applied to a specific path. That is, when it is highly probable that a first path would be selected as the target path in a current cycle, based on the state information of the paths in a previous cycle, a lot of ECUs may transmit the data through the first path, and accordingly, loads of ECUs located on the first path may exceed limit loads.

Therefore, the source ECU according to an embodiment may further obtain, as the state information of the paths, identification information of an ECU through which the ECUs located on each path are to transmit data in the current cycle and information indicating the amount of data to be transmitted in the current cycle. For example, ECU B may transmit, to the source ECU, identification information of an ECU through which data is to be transmitted in a next cycle, that is, the current cycle, based on the state information of the paths in the previous cycle. Based on the identification information of the ECU transmitted from ECU B, the source ECU may predict a degree of load to be applied, when the target data is to be transmitted through the corresponding ECU in the current cycle. That is, when all of the ECUs are to transmit the data through a specific ECU in the current cycle, even when a use rate of the specific ECU was low in the previous cycle, the source ECU may select a path not including the corresponding ECU, as the target path. For example, even when loads applied to ECU D and ECU F included in a third path, due to the target data, are less than the limit loads, the source ECU may select, as the target path, another path rather than the third path, by taking into account the amount of data predicted to be transmitted by the ECUs to ECU D and ECU F.

After the source ECU analyzes and processes row data collected from the sensor, the source ECU may generate the target data to be transmitted to the destination ECU. In this case, as the number of pieces of row data or a size of the row data increases, it may be an excessive burden for the source ECU to process the entire row data.

Thus, according to an embodiment, the source ECU may split the row data into row data parts and may process some of the split parts itself and transmit the others to another ECU (that is, a backup ECU) connected to the source ECU. In detail, the source ECU may split the row data into a first row data part and a second row data part and may process the first row data part itself to generate a first target data part. The first target data part may be transmitted to the destination ECU through the target path described above. The source ECU may transmit the second row data part to the backup ECU connected to the source ECU, and the backup ECU may process the received second row data part to generate a second target data part. Also, the backup ECU may transmit the second target data part to the destination ECU on behalf of the source ECU. Here, the backup ECU may select the target path for transmitting the second target data part based on the state information of the paths.

Figure 9:
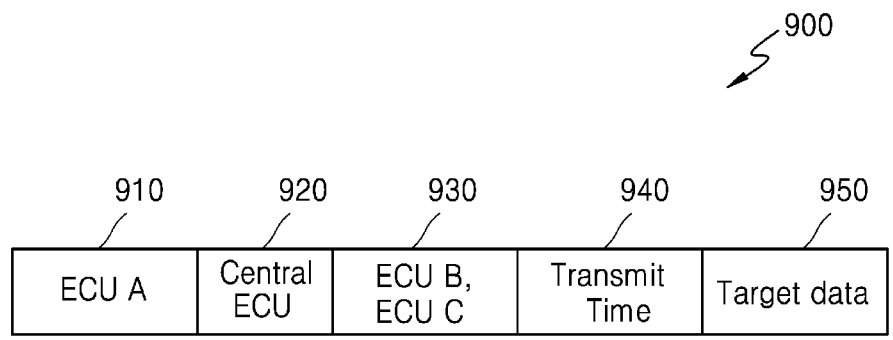
FIG. 9 is an example diagram showing a data packet transmitted from a source ECU to another ECU according to an embodiment of the disclosure.

FIG. 9 is an example diagram showing a data packet transmitted from a source ECU to another ECU according to an embodiment of the disclosure.

As described above, the source ECU may transmit the target data to a destination ECU through the target path, and the source ECU may transmit not only the target data, but also the data packet 900 including information related to the target data.

Referring to FIG. 9, the data packet 900 may include at least one of identification information 910 of the source ECU, identification information 920 of the destination ECU, target path information 930, transmission time information 940, and target data 950.

The identification information 910 of the source ECU and the identification information 920 of the destination ECU from the information illustrated in FIG. 9 may not be changed by other ECUs on the target path. The backup ECU described above may set the identification information 910 of the source ECU as identification information of an ECU having transmitted a row data part to the backup ECU, rather than as identification information of the backup ECU. This may be to prevent an error of the central ECU 20 transmitting, by mistake, control instructions generated based on the target data to the backup ECU, rather than the original source ECU.

According to an embodiment, ECUs receiving the data packet 900 may add a transmission and reception time of the data packet 900 in the data packet 900. The transmission and reception time of the data packet 900 may be used to calculate latencies of the paths.

According to an embodiment, the target path information 930 in the data packet 900 may be changed by an ECU located on the target path. In detail, when ECU A transmits, as the source ECU, the data packet 900 to ECU B, ECU B may change the target path identified from the data packet 900 transmitted by ECU A. This may be because even when the source ECU selects the optimum target path based on state information of the paths, a reason of changing the target path may occur during an actual data transmission process. For example, ECU B may change the target path, when a significantly large load is applied to ECU C located on the target path. This aspect will be described with reference to FIG. 10.

Figure 10:
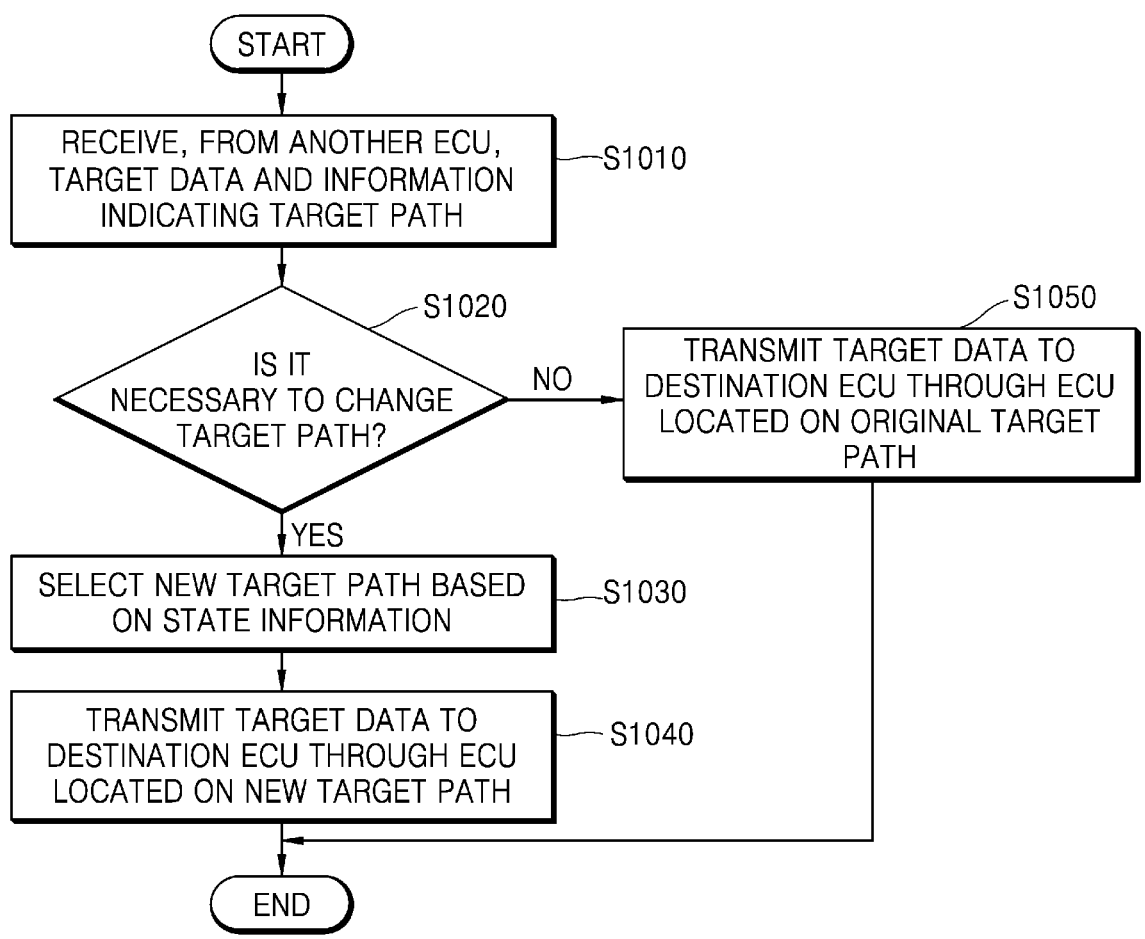
FIG. 10 is a flowchart of a method of determining a target path, according to an embodiment of the disclosure.

FIG. 10 is a flowchart of a method of determining a target path, according to an embodiment of the disclosure.

FIG. 10 illustrates a process performed by a first source ECU. Here, it is assumed that the first source ECU is to transmit its first target data to a destination ECU, and a second source ECU is to transmit its second target data to the destination ECU through the first source ECU.

In operation S1010, the first source ECU receives the second target data and information indicating a second target path from another ECU, for example, the second source ECU. The second target data and the second target path may be included in a data packet, but the transmission format thereof is not limited to a packet.

In operation S1020, the first source ECU may determine whether it is necessary to change the second target path.

For example, the first source ECU may determine that it is necessary to change the second target path when a large amount of data is concentrated on an ECU located on the second target path. In detail, when data causing a load exceeding a limit load of the ECU located on the second target path is transmitted or expected to be transmitted to the ECU, the first source ECU may determine that it is necessary to change the second target path.

When it is necessary to change the second target path, the first source ECU may select a new second target path based on state information of paths, in operation S1030.

For example, the first source ECU may select the new second target path as a first target path selected to transmit the first target data of the first source ECU. As another example, the first source ECU may select the new second target path by taking into account current states of ECUs on each path.

In operation S1040, the first source ECU may transmit the second target data to the destination ECU through an ECU located on the new second target path. Also, the first source ECU may transmit its first target data to the destination ECU through an ECU located on the first target path.

When it is not necessary to change the second target path, the first source ECU may transmit the second target data to the destination ECU through the original second target path, in operation S1050. Also, the first source ECU may transmit its first target data to the destination ECU through the ECU located on the first target path.

According to an embodiment of the disclosure, at least one of the operations performed by the ECU, in detail, the processor 220 of the ECU, may be performed by using an artificial intelligence (AI) technique. The at least one operation performed by using the AI technique will be described in detail hereinafter with reference to FIG. 11.

Figure 11:
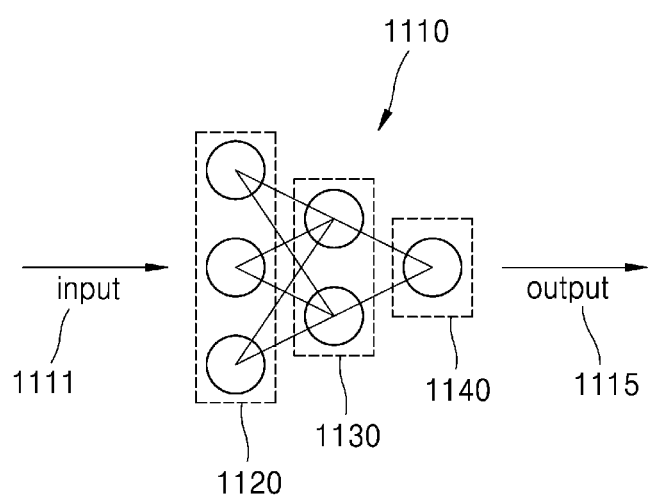
FIG. 11 is a diagram for describing an operation performed by using an artificial intelligence (AI) technique, according to an embodiment of the disclosure.

FIG. 11 is a diagram for describing an operation performed by using an AI technique according to an embodiment of the disclosure.

In detail, the operation, performed by the ECU, of selecting the target path may be performed by using the AI technique performing an operation through a neural network. For example, the operation may be performed based on the AI technique based on the state information of the paths described above.

The artificial intelligence technique (hereinafter, the "AI technique") is a technique for obtaining a target result via processing, such as analysis and/or classification of input data, based on the neural network operation.

The AI technique may be realized by using an algorithm. Here, the algorithm or a set of algorithms for realizing the AI technique is referred to as a neural network. Here, the neural network may output resultant data by receiving input data and performing the operation for analysis and/or classification described above. In order for the neural network to accurately output corresponding resultant data, it is required to train the neural network. Here, "training" may denote to train the neural network to directly discover or learn a method of analyzing pieces data input into the neural network, a method of classifying the pieces of input data, and/or a method of extracting a feature required for generating the resultant data from the pieces of input data. In detail, through the training, the neural network may optimize weight values in the neural network via training using training data. Also, the input data may be processed through the neural network having the optimized weight values, and thus, the target result may be output.

When the neural network has a plurality of hidden layers, which are internal layers performing the operation, that is, when a depth of the neural network performing the operation is increased, the neural network may be classified as a deep neural network (DNN). Examples of the neural network may include a convolutional neural network (CNN), a DNN, a recurrent neural network (RNN), a restricted Boltzmann machine (RBM), a deep belief network (DBN), a bidirectional recurrent deep neural network (BRDNN), a deep Q-network, etc., but are not limited to thereto. Also, the neural network may be sub-divided. For example, a CNN may be sub-divided into a deep CNN (DCNN) or a capsule network (capsnet) neural network (not shown).

An "AI model" may denote a neural network including at least one layer operating to receive input data and output a target result. Also, the "AI model" may denote an algorithm or a set of plurality of algorithms for performing an operation through a neural network and outputting a target result, a processor for executing the algorithm (or the set of algorithms), software for executing the algorithm (or the set of algorithms), or hardware for executing the algorithm (or the set of algorithms).

The operation of selecting the target path described above may be performed based on the AI model.

Referring to FIG. 11, a neural network 1110 may be trained by receiving training data. Also, the trained neural network 1110 may receive input data 1111 through an input 1120, and the input 1120, a hidden layer 1130, and an output 1140 may analyze the input data 1111 and data transmitted from a previous layer to perform an operation for outputting output data 1115. FIG. 11 illustrates that the hidden layer 1130 is a single layer. However, it is only an example, and the hidden layer 1130 may include a plurality of layers.

According to an embodiment of the disclosure, the neural network 1110 may learn a method of selecting, based on the state information of the paths, the target path for not applying an excessive load to ECUs and for transmitting target data within a short latency. The neural network 1110 completely trained may receive the state information of the paths and select the target path from among the plurality of paths.

According to an embodiment of the disclosure, the neural network performing the operation of selecting the target path according to the state information of the paths described above may be implemented in a processor (for example, the processor 220 of FIG. 2).

Alternatively, the neural network performing the operation of selecting the target path according to the state information of the paths described above may be implemented in an additional electronic device (not shown) or processor (not shown) separate from the ECU 200.

The operation through the neural network described above may also be performed by a server (not shown) capable of communicating with the ECU 200 according to an embodiment through a wireless communication network. The communication between the ECU 200 and the server (not shown) will be described with reference to FIGS. 12 and 13.

Figure 12:
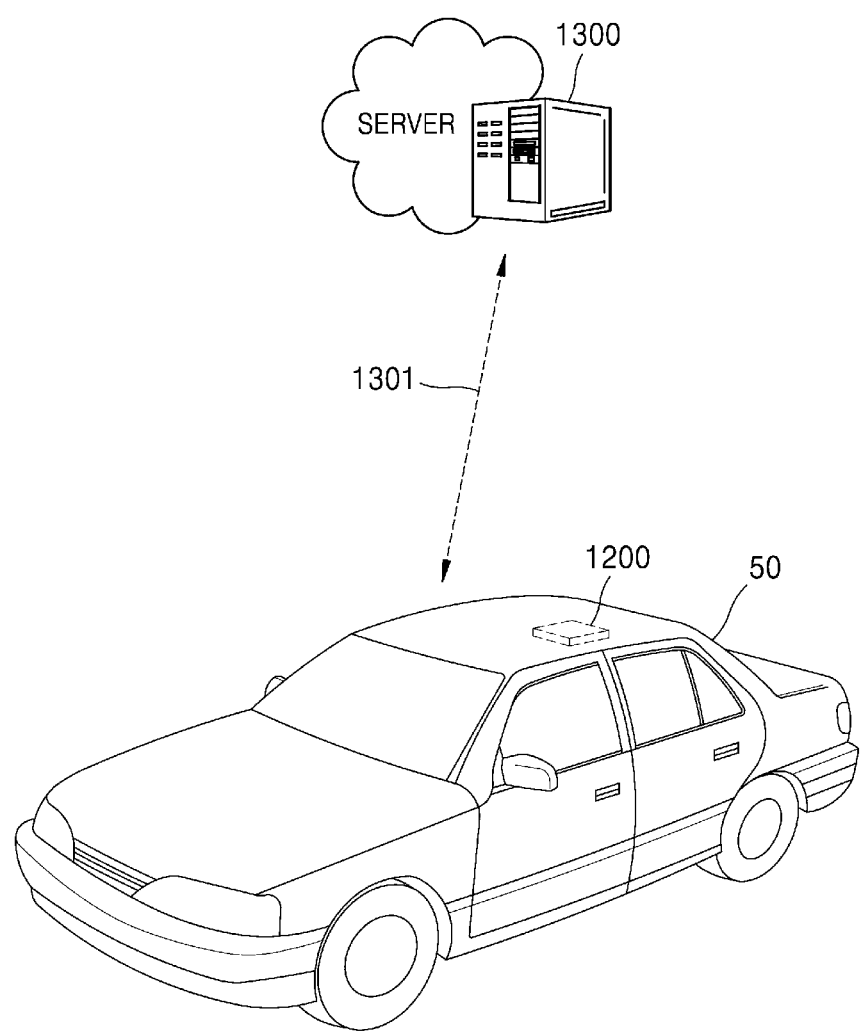
FIG. 12 is a diagram showing an ECU operating in synchronization with a server according to an embodiment of the disclosure.

FIG. 12 is a diagram of an ECU operating in synchronization with a server, according to an embodiment of the disclosure.

According to an embodiment of the disclosure, after a target path is selected by a server 1300 from among a plurality of paths, the target path may be transmitted to an ECU 1200 located in a vehicle 50. The server 1300 may select the target path by transmitting and receiving data to and from the ECU 1200 through a communication network.

According to an embodiment, a vehicle electronic device may receive information about the target path from the server 1300 and transmit the received information to the ECU 1200. In this case, the ECU 1200 may select the target path according to the information received from the vehicle electronic device.

Figure 13:
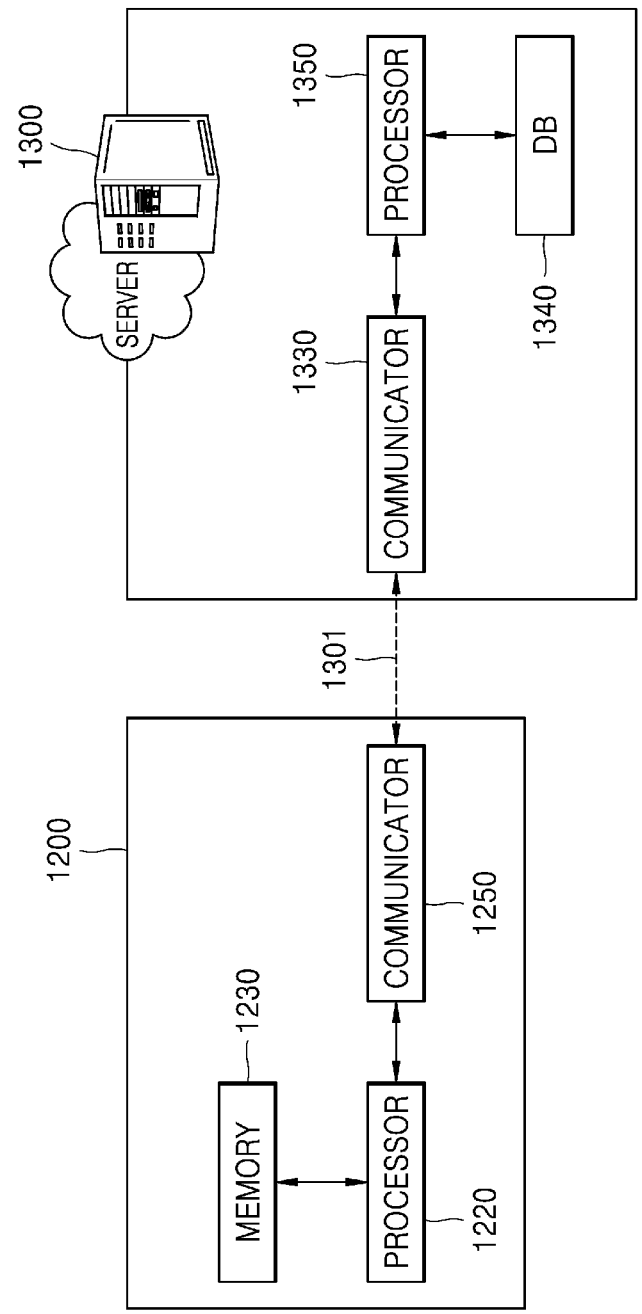
FIG. 13 is a diagram for describing FIG. 12 in detail according to an embodiment of the disclosure.

FIG. 13 is a diagram for describing FIG. 12 in detail according to an embodiment of the disclosure.

Referring to FIG. 13, the server 1300 may include a communicator 1330 communicating with the ECU 1200, and a processor 1350 executing at least one instruction.

The processor 1350 of the server 1300 may receive state information of paths and may select the target path according to the received information. The communicator 1330 may transmit information indicating the target path to the ECU 1200.

According to an embodiment of the disclosure, the server 1300 may select the target path by performing the operation through the neural network 1110 described with reference to FIG. 11. In detail, the server 1300 may train an AI model and store the trained AI model. Also, the server 1300 may select the target path described above by using the trained AI model.

In general, a memory storage capacity, an operation-processing speed, and a capability of collecting a training data set of the ECU 1200 may be limited compared to those of the server 1300. Thus, an operation requiring storage of a large volume of data and execution of a large volume of operations may be performed by the server 1300, and then, data and/or an AI model required may be transmitted to the ECU 1200 through a communication network. Then, even without a processor having a memory of a large capacity and a high-speed arithmetic operation capacity, the ECU 1200 may rapidly and easily perform a required operation by receiving and using the required data and/or AI model from the server 1300.

According to an embodiment of the disclosure, the server 1300 may include the neural network 1110 described with reference to FIG. 11. In detail, the neural network 1110 included in the server 1300 may perform the operation for selecting the target path described above.

Referring to FIG. 13, the ECU 1200 may include a memory 1230 (e.g., the memory 230 in FIG. 2), a processor 1220 (e.g., the processor 220 in FIG. 2), and may further include a communicator 1250 compared with the ECU 200 described with reference to FIG. 2.

The communicator 1250 may perform communication with an external device (for example, a server) through a wireless communication network 1301. Here, the external device (not shown) may include a server (for example, the server 1300) configured to perform at least one of operations required by the ECU 1200 or transmit data, etc. required by the ECU 1200.

The communicator 1250 may include at least one communication module, such as a short-range wireless communication module, a wired communication module, a mobile communication module, a broadcasting reception module, etc. Here, the at least one communication module may refer to a communication module capable of performing data transmission and reception through a network according to the communication standards, such as a communication scheme using a tuner performing broadcasting reception, Bluetooth™, wireless local area network (LAN) (WLAN) wireless-fidelity (Wi-fi), wireless broadband (Wibro), world interoperability for microwave access (wimax), code-division multiple access (CDMA), wideband CDMA (WCDMA), the Internet, third generation (3G), fourth generation (4G), fifth generation (5G) and/or millimeter wave (mmwave).

For example, when the communicator 1250 performs communication using mmWave, a large volume of data may be rapidly transmitted and received. In detail, the safety of the vehicle 50 and the convenience of a user may be increased, when the vehicle 50 rapidly receives a large volume of data by using mmWave and quickly provides data (for example, data required for autonomous driving, data required for a navigation service, etc.) required for the safety of the vehicle 50, the user use content (for example, movies, music, etc.), etc.

The mobile communication module included in the communicator 1250 may perform communication with another device (for example, the server 1300) remotely located, through a communication network according to the communication standards, such as the third generation (3G), the fourth generation (4G), and/or the fifth generation (5G). Here, the communication module performing communication with the other device remotely located may be referred to as a "remote communication module."

Referring to FIG. 13, the server 1300 may include the communicator 1330 and the processor 1350. Also, the server 1300 may further include a database (DB) 1340.

The communicator 1330 may include one or more components facilitating communication with the ECU 1200. Detailed components of the communicator 1330 may correspond to the components of the communicator 1250 described above, and thus, their detailed descriptions are omitted.

For example, the communicator 1330 may include at least one communication module performing communication with another device (for example, the ECU 1200) remotely located, through a communication network according to the communication standards, such as the Internet, the 3G, the 4G, and/or the 5G).

The processor 1350 may control general operations of the server 1300. For example, the processor 1350 may perform required operations by executing one or more instructions and one or more programs of the server 1300.

The DB 1340 may include a memory (not shown), and the memory (not shown) may store at least one of one or more instructions, one or more programs, and one or more pieces of data, required for the server 1300 to perform a predetermined operation. Also, the DB 1340 may store pieces of data required for the server 1300 to perform an operation according to a neural network.

According to an embodiment of the disclosure, the server 1300 may store the neural network 1110 described with reference to FIG. 11. The neural network 1110 may be stored in at least one of the processor 1350 and the DB 1340. The neural network 1110 included in the server 1300 may be completely trained.

According to an embodiment of the disclosure, the server 1300 may select the target path described above by using the neural network internally provided in the server 1300 and may transmit information about the selected target path to the communicator 1250 of the ECU 1200 through the communicator 1330.

Also, the server 1300 may transmit the completely trained neural network to the communicator 1250 of the ECU 1200 through the communicator 1330. Then, the ECU 1200 may obtain and store the completely trained neural network and obtain desired target output data through the neural network.

Figure 14:
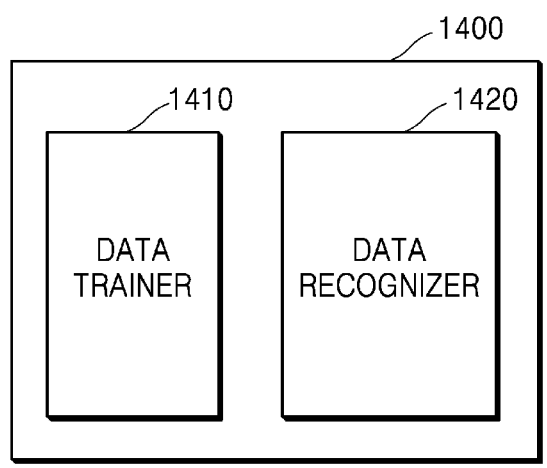
FIG. 14 is a block diagram of a processor included in an ECU according to an embodiment of the disclosure.

FIG. 14 is a block diagram of a processor included in an ECU according to an embodiment of the disclosure.

Referring to FIG. 14, a processor 1400 according to one or more embodiments may include a data trainer 1410 and a data recognizer 1420.

The data trainer 1410 may perform a training operation with respect to criteria for selecting a target path. The data trainer 1410 may perform the training operation with respect to the criteria with respect to which data to use to select a target path and how to select the target path by using the data. The data trainer 1410 may perform the training operation with respect to the criteria for selecting the target path, by obtaining data to be used for the training operation and applying the obtained data to a data recognition model.

The data recognizer 1420 may select the target path based on the data (for example, state information data). The data recognizer 1420 may select the target path from predetermined data by using the trained data recognition model. The data recognizer 1420 may obtain predetermined data according to the predetermined criteria obtained by training and may use the data recognition model by using the obtained data as an input value, to select the target path based on the predetermined data. Also, a result value output by the data recognition model by using the obtained data as the input value may be used to modify and refine the data recognition model.

At least one of the data trainer 1410 and the data recognizer 1420 may be manufactured in the form of at least one hardware chip and mounted on an electronic device. For example, at least one of the data trainer 1410 and the data recognizer 1420 may be manufactured in the form of an AI-dedicated hardware chip or may be manufactured as part of a previous general-purpose processor (for example, a central processing unit (CPU) or an application processor) or graphics-dedicated processor (for example, a graphics processing unit (GPU)) and mounted on various electronic devices described above.

In this case, the data trainer 1410 and the data recognizer 1420 may be mounted on one electronic device, each of the data trainer 1410 and the data recognizer 1420 may be mounted on a separate electronic device. For example, one of the data trainer 1410 and the data recognizer 1420 may be included in the electronic device, and the other may be included in a server. Also, the data trainer 1410 and the data recognizer 1420 may be connected with each other by wire or wirelessly, and the model data established by the data trainer 1410 may be provided to the data recognizer 1420, or the data that is input into the data recognizer 1420 may be provided to the data trainer 1410 as additional training data.

At least one of the data trainer 1410 and the data recognizer 1420 may be implemented as a software module. When the at least one of the data trainer 1410 and the data recognizer 1420 is implemented as a software module (or a program module including an instruction), the software module may be stored in non-transitory computer-readable recording media. Also, in this case, the one or more software modules may be provided by an operating system (OS) or a predetermined application. Alternatively, some of the one or more software modules may be provided by the OS, and the others may be provided by the predetermined application.

Figure 15:
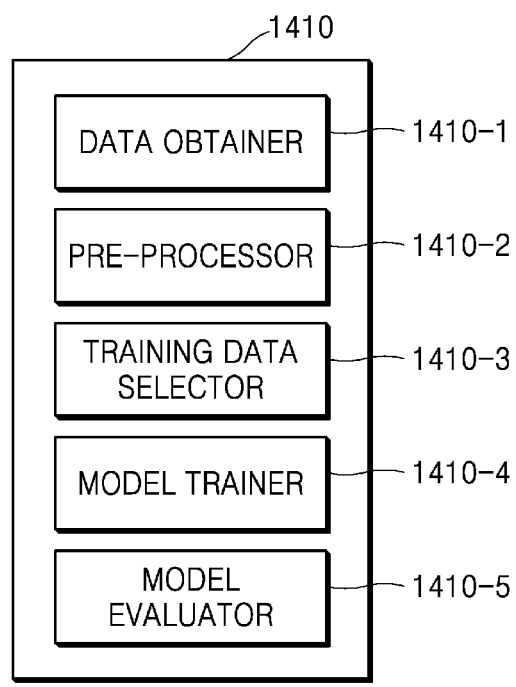
FIG. 15 is a block diagram of a data trainer according to an embodiment of the disclosure.

FIG. 15 is a block diagram of the data trainer according to an embodiment of the disclosure.

Referring to FIG. 15, the data trainer 1410 according to one or more embodiments may include a data obtainer 1410-1, a pre-processor 1410-2, a training data selector 1410-3, a model trainer 1410-4, and a model evaluator 1410-5.

The data obtainer 1410-1 may obtain the data required for selecting the target path. The data obtainer 1410-1 may obtain data required for a training operation with respect to a method of selecting the target path.

The pre-processor 1410-2 may pre-process the data obtained for training. The pre-processor 1410-2 may process the data into a predetermined format so that the model trainer 1410-4 to be described below may use the data for the training operation for selecting the target path.

The training data selector 1410-3 may select data needed for the training operation from the pre-processed data. The selected data may be provided to the model trainer 1410-4. The training data selector 1410-3 may select the data needed for the training operation from the pre-processed data, according to the predetermined criteria for selecting the target path. Also, the training data selector 1410-3 may select the data according to the criteria predetermined by the training operation by the model trainer 1410-4 to be described below.

The model trainer 1410-4 may perform the training operation with respect to criteria for how to select the target path based on the training data. Also, the model trainer 1410-4 may perform the training operation with respect to criteria for which training data to use for selecting the target path.

Also, the model trainer 1410-4 may train the data recognition model used for selecting the target path, by using the training data. In this case, the data recognition model may be a pre-established model. For example, the data recognition model may be pre-established by receiving default training data (for example, sample data, etc.) as an input.

The data recognition model may be established by taking into account an application field of the recognition model, a purpose of training, the computer performance of a device, or the like. The data recognition model may be, for example, a model based on a neural network. For example, models, such as a CNN, a DNN, an RNN, and a BRDNN, may be used as the data recognition model, but the data recognition model is not limited thereto.

According to various embodiments, when there are a plurality of pre-established data recognition models, the model trainer 1410-4 may determine a data recognition model having a relatively greater relevance between input training data and default training data, as a data recognition model to perform the training operation. In this case, the default training data may be pre-classified into types of data, and the data recognition model may be pre-established for each type of data. For example, the default training data may be pre-classified based on various criteria, such as a region in which training data is generated, a time at which the training data is generated, a volume of the training data, a genre of the training data, a generator of the training data, a type of object in the training data, etc.

Also, the model trainer 1410-4 may train the data recognition model by using a training algorithm, etc., including, for example, error back-propagation or gradient descent.

Also, the model trainer 1410-4 may train the data recognition model, for example, through supervised learning using training data as an input value. Also, the model trainer 1410-4 may train the data recognition model via, for example, unsupervised learning, according to which criteria for selecting the target path are discovered via direct learning of a type of data needed for recognizing the target path, without additional supervision. Also, the model trainer 1410-4 may train the data recognition model via, for example, reinforcement learning using feedback with respect to whether a result of the selecting of the target path according to the training is correct or not.

Also, when the data recognition model is trained, the model trainer 1410-4 may store the trained data recognition model. In this case, the model trainer 1410-4 may store the trained data recognition model in a memory of the electronic device including the data recognizer 1420. Alternatively, the model trainer 1410-4 may store the trained data recognition model in the memory of the electronic device including the data recognizer 1420 to be described below. Alternatively, the model trainer 1410-4 may store the trained data recognition model in a memory of the server connected with the electronic device by a wired or wireless network.

In this case, the memory storing the trained data recognition model may, for example, also store a command or data associated with at least another component of the electronic device. Also, the memory may store software and/or a program. The program may include, for example, a kernel, middleware, an application programming interface (API), and/or an application program (or an "application").

The model evaluator 1410-5 may input evaluation data into the data recognition model, and when a recognition result output from the evaluation data does not satisfy a predetermined criterion, may make the model trainer 1410-4 perform the training operation again. In this case, the evaluation data may be data predetermined for evaluating the data recognition model.

For example, the model evaluator 1410-5 may evaluate that the predetermined criterion is not satisfied, when the number or a rate of pieces of evaluation data, with respect to which recognition results are incorrect, exceeds a predetermined threshold value, from among recognition results of the data recognition model with respect to the evaluation data. For example, when the predetermined criterion is defined as a rate of 2%, the model evaluator 1410-5 may evaluate that the data recognition model is not appropriate, when the trained data recognition model outputs wrong recognition results with respect to more than 20 pieces of evaluation data from among the total of 1,000 pieces of evaluation data.

When there are a plurality of trained data recognition models, the model evaluator 1410-5 may evaluate whether a predetermined criterion is satisfied with respect to each trained data recognition model and may determine a model satisfying the predetermined criterion as a final data recognition model. In this case, when there are a plurality of models satisfying the predetermined criterion, the model evaluator 1410-5 may determine a predetermined number of models, i.e., one or more models, as the final data recognition model, according to an order of a high evaluation score.

At least one of the data obtainer 1410-1, the pre-processor 1410-2, the training data selector 1410-3, the model trainer 1410-4, and the model evaluator 1410-5 in the data trainer 1410 may be manufactured in the form of at least one hardware chip and mounted on the electronic device. For example, at least one of the data obtainer 1410-1, the pre-processor 1410-2, the training data selector 1410-3, the model trainer 1410-4, and the model evaluator 1410-5 may be manufactured in the form of an AI-dedicated hardware chip or may be manufactured as part of a previous general-purpose processor (for example, a CPU or an application processor) or graphics-dedicated processor (for example, a GPU) and mounted on various electronic devices described above.

Also, the data obtainer 1410-1, the pre-processor 1410-2, the training data selector 1410-3, the model trainer 1410-4, and the model evaluator 1410-5 may be mounted on one electronic device or may be mounted on separate electronic devices, respectively. For example, some of the data obtainer 1410-1, the pre-processor 1410-2, the training data selector 1410-3, the model trainer 1410-4, and the model evaluator 1410-5 may be included in the electronic device and the others may be included in a server.

Also, at least one of the data obtainer 1410-1, the pre-processor 1410-2, the training data selector 1410-3, the model trainer 1410-4, and the model evaluator 1410-5 may be implemented as a software module. When the at least one of the data obtainer 1410-1, the pre-processor 1410-2, the training data selector 1410-3, the model trainer 1410-4, and the model evaluator 1410-5 is implemented as a software module (or a program module including an instruction), the software module may be stored in non-transitory computer-readable recording media. Also, in this case, the one or more software modules may be provided by an OS or a predetermined application. Alternatively, some of the one or more software modules may be provided by the OS, and the others may be provided by the predetermined application.

Figure 16:
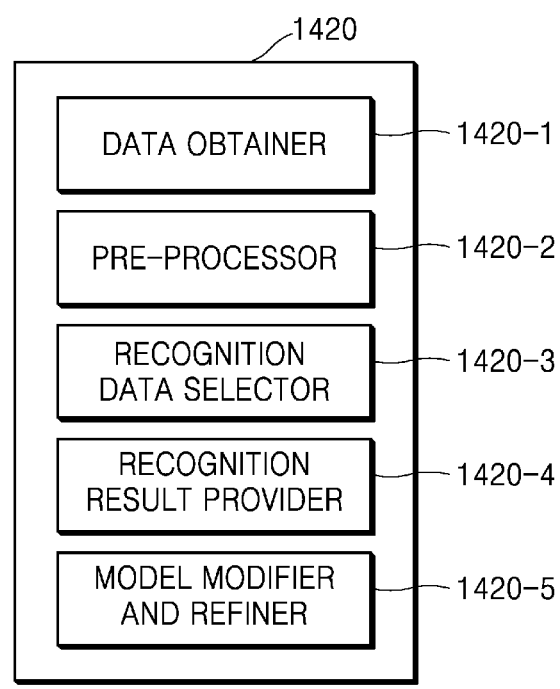
FIG. 16 is a block diagram of a data recognizer according to an embodiment of the disclosure.

FIG. 16 is a block diagram of a data recognizer according to an embodiment of the disclosure.

Referring to FIG. 16, the data recognizer 1420 according to one or more embodiments may include a data obtainer 1420-1, a pre-processor 1420-2, a recognition data selector 1420-3, a recognition result provider 1420-4, and a model modifier and refiner 1420-5.

The data obtainer 1420-1 may obtain the data required for selecting the target path, and the pre-processor 1420-2 may pre-process the data obtained for selecting the target path to use the obtained data. The pre-processor 1420-2 may process the obtained data into a predetermined format so that the recognition result provider 1420-4 to be described below may use the data obtained for selecting the target path.

The recognition data selector 1420-3 may select the data required for selecting the target path from the pre-processed data. The selected data may be provided to the recognition result provider 1420-4 The recognition data selector 1420-3 may select part or the whole of the pre-processed data, according to the predetermined criteria for selecting the target path. Also, the recognition data selector 1420-3 may select the data according to the criteria predetermined by the training operation by the model trainer 1410-4.

The recognition result provider 1420-4 may select the target path by applying the selected data to the data recognition model. The recognition result provider 1420-4 may provide a recognition result according to a purpose of data recognition. The recognition result provider 1420-4 may use the data selected by the recognition data selector 1420-3 as an input value to apply the selected data to the data recognition model. Also, the recognition result may be determined by the data recognition model.

The model modifier and refiner 1420-5 may have the data recognition model modified and refined, based on an evaluation with respect to the recognition result provided by the recognition result provider 1420-4. For example, the model modifier and refiner 1420-5 may provide the recognition result provided by the recognition result provider 1420-4 to the model trainer 1410-4, so that the model trainer 1410-4 may modify and refine the data recognition model.

At least one of the data obtainer 1420-1, the pre-processor 1420-2, the recognition data selector 1420-3, the recognition result provider 1420-4, and the model modifier and refiner 1420-5 in the data recognizer 1420 may be manufactured in the form of at least one hardware chip and mounted on the electronic device. For example, at least one of the data obtainer 1420-1, the pre-processor 1420-2, the recognition data selector 1420-3, the recognition result provider 1420-4, and the model modifier and refiner 1420-5 may be manufactured in the form of an AI-dedicated hardware chip or may be manufactured as part of a previous general-purpose processor (for example, a CPU or an application processor) or graphics-dedicated processor (for example, a GPU) and mounted on various electronic devices described above.

Also, the data obtainer 1420-1, the pre-processor 1420-2, the recognition data selector 1420-3, the recognition result provider 1420-4, and the model modifier and refiner 1420-5 may be mounted on one electronic device or may be mounted on separate electronic devices, respectively. For example, some of the data obtainer 1420-1, the pre-processor 1420-2, the recognition data selector 1420-3, the recognition result provider 1420-4, and the model modifier and refiner 1420-5 may be included in the electronic device, and the others may be included in a server.

Also, at least one of the data obtainer 1420-1, the pre-processor 1420-2, the recognition data selector 1420-3, the recognition result provider 1420-4, and the model modifier and refiner 1420-5 may be implemented as a software module. When the at least one of the data obtainer 1420-1, the pre-processor 1420-2, the recognition data selector 1420-3, the recognition result provider 1420-4, and the model modifier and refiner 1420-5 is implemented as a software module (or a program module including an instruction), the software module may be stored in non-transitory computer-readable recording media. Also, in this case, the one or more software modules may be provided by an OS or a predetermined application. Alternatively, some of the one or more software modules may be provided by the OS, and the others may be provided by the predetermined application.

Figure 17:
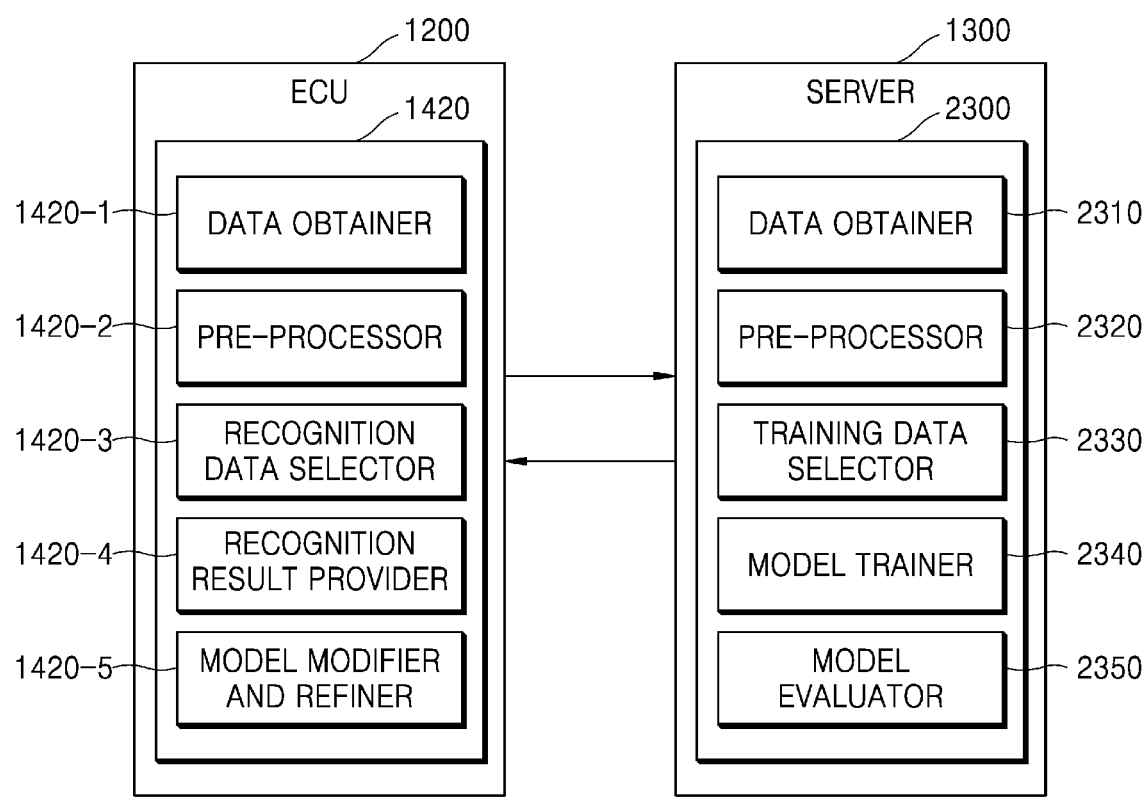
FIG. 17 is a diagram showing an example in which an ECU and a server perform a training and recognizing operation with respect to data in synchronization with each other, according to an embodiment of the disclosure.

FIG. 17 is a diagram showing an example in which an ECU and a server perform a training and recognition operation with respect to data in synchronization with each other, according to an embodiment of the disclosure.

Referring to FIG. 17, the server 1300 may perform a training operation with respect to criteria for selecting a target path, and the ECU 1200 may select the target path based on a result of the training operation by the server 1300.

In this case, a data trainer 2300 of the server 1300 may perform the function of the data trainer 1410 illustrated in FIG. 15. The data trainer 2300 according to one or more embodiments may include a data obtainer 2310, a preprocessor 2320, a training data selector 2330, a model trainer 2340, and a model evaluator 2350. The data trainer 2300 of the server 1300 may perform a training operation with respect to criteria with respect to which data to use to determine a predetermined situation and how to select the target path by using data. The data trainer 2300 may perform the training operation with respect to the criteria for selecting the target path, by obtaining data to be used for the training operation and applying the obtained data to a data recognition model.

Also, the recognition result provider 1420-4 of the ECU 1200 may select the target path by applying data selected by the recognition data selector 1420-3 to the data recognition model generated by the server 1300. For example, the recognition result provider 1420-4 may transmit the data selected by the recognition data selector 1420-3 to the server 1300 and may request the server 1300 to apply the data selected by the recognition data selector 1420-3 to the data recognition model to select the target path. Also, the recognition result provider 1420-4 may receive, from the server 1300, information about the target path selected by the server 1300.

Alternatively, the recognition result provider 1420-4 of the ECU 1200 may receive, from the server 1300, the recognition model generated by the server 1300, and may select the target path by using the received recognition model. In this case, the recognition result provider 1420-4 of the ECU 1200 may select the target path by applying the data selected by the recognition data selector 1420-3 to the data recognition model received from the server 1300.

Embodiments of the disclosure described above may be written as programs executable by a computer, and the written programs may be stored in media.

The media may consistently store the programs executable by the computer or temporarily store the programs for execution or downloading. Also, the media may include various writing devices or storages having the form in which a single or multiple pieces of hardware are combined. The media may not be limited to types of media directly connected to a predetermined computer system and may be present in a network in a distributed manner Here, examples of the media may include a magnetic medium, such as a hard disk, a floppy disk, and a magnetic tape, an optical recording medium, such as compact disk (CD)-read-only memory (ROM) and digital versatile disk (DVD), a magneto-optical medium, such as a floptical disk, and a device configured to store a program command, such as ROM, random-access memory (RAM), and flash memory. Also, other examples of the media may include an app store distributing an application, a site supplying or distributing various software, and recording media or storages managed by a server, etc.

While the disclosure has been shown and described with reference to various embodiments. thereof, it will be understood by those skilled in the art that various changes in form and details may be made therein without departing from the spirit and scope of the disclosure as defined by the appended claims and their equivalents.

What is claimed is:

1. A method of determining a target path by a source electronic control unit (ECU) mounted on a vehicle, the method comprising:
obtaining state information of a plurality of paths connecting the source ECU with a destination ECU;
based on the state information, selecting the target path for target data from among the plurality of paths; and
transmitting the target data to the destination ECU through an ECU located on the selected target path,
wherein the state information comprises information about at least one of power consumption of ECUs located on the plurality of paths, a temperature of the ECUs located on the plurality of paths, a latency of the plurality of paths, or a transmission success rate of the plurality of paths, and
wherein, from among the plurality of paths, the target path including an ECU, a predicted temperature of which being less than a limit temperature, is selected.

2. The method of claim 1, wherein the selecting of the target path comprises:
identifying a reference latency corresponding to a degree of importance of the target data; and
selecting the target path having a latency less than or equal to the reference latency from among the plurality of paths.

3. The method of claim 1, wherein the selecting of the target path comprises selecting the target path including an ECU, predicted power consumption of which being less than limit power consumption, from among the plurality of paths.

4. The method of claim 1,
wherein the selecting of the target path comprises selecting a plurality of target paths for the target data from among the plurality of paths, and
wherein the transmitting of the target data comprises:
splitting the target data into a plurality of target data parts; and
transmitting the plurality of target data parts to the destination ECU through ECUs located on the selected plurality of target paths.

5. The method of claim 1, further comprising:
splitting row data into a first row data part and a second row data part;
generating a first target data part by processing the first row data part; and
transmitting the second row data part to another ECU,
wherein the transmitting of the target data comprises transmitting the first target data part to the destination ECU through the ECU located on the selected target path,
wherein the second row data part is processed by the other ECU, and
wherein a second target data part generated as a result of the processing of the second row data part is transmitted from the other ECU to the destination ECU.

6. The method of claim 1,
wherein the state information is obtained for each predetermined cycle, and
wherein the target path to be used for a current cycle is selected based on the state information of a previous cycle.

7. The method of claim 6,
wherein the obtaining of the state information comprises obtaining, from a plurality of ECUs mounted on the vehicle, identification information of an ECU through which data is to be transmitted in the current cycle, and wherein the selecting of the target path comprises selecting the target path based on an amount of data to be transmitted to each of the ECUs in the current cycle.

8. The method of claim 1, further comprising:

receiving information indicating the target path and the target data from another ECU connected to the source ECU, wherein the target path selected from among the plurality of paths is different from the target path indicated by the information received from the other ECU.

9. The method of claim 1, wherein the selecting of the target path comprises:

inputting the state information to a deep neural network (DNN) trained based on training information; and based on an output result of the DNN, selecting the target path.

10. A source electronic control unit (ECU) mounted on a vehicle, the source ECU comprising:

a memory storing state information of a plurality of paths connecting the source ECU with a destination ECU;

a processor configured to:

obtain the state information of the plurality of paths connecting the source ECU with the destination ECU, and based on the state information, select a target path for target data from among the plurality of paths; and an output port configured to transmit the target data to the destination ECU through an ECU located on the selected target path, wherein the state information comprises information about at least one of power consumption of ECUs located on the plurality of paths, a temperature of the ECUs located on the plurality of paths, a latency of the plurality of paths, or a transmission success rate of the plurality of paths, and wherein, from among the plurality of paths, the target path including an ECU, a predicted temperature of which being less than a limit temperature, is selected.

11. The source ECU of claim 10, wherein the processor is further configured to:

identify a reference latency corresponding to a degree of importance of the target data, and select the target path having a latency less than or equal to the reference latency from among the plurality of paths.

12. The source ECU of claim 10, wherein the processor is further configured to:

select a plurality of target paths for the target data from among the plurality of paths and split the target data into a plurality of target data parts, and wherein the output port is further configured to transmit the plurality of target data parts to the destination ECU through ECUs located on the selected plurality of target paths.

13. The source ECU of claim 10, wherein the processor is further configured to:

split row data into a first row data part and a second row data part and generate a first target data part by processing the first row data part, wherein the output port is further configured to transmit the second row data part to another ECU and transmit the first target data part to the destination ECU through the ECU located on the selected target path, wherein the second row data part is processed by the other ECU, and wherein a second target data part generated as a result of the processing of the second row data part is transmitted from the other ECU to the destination ECU.

* * * * *